Figure 1:
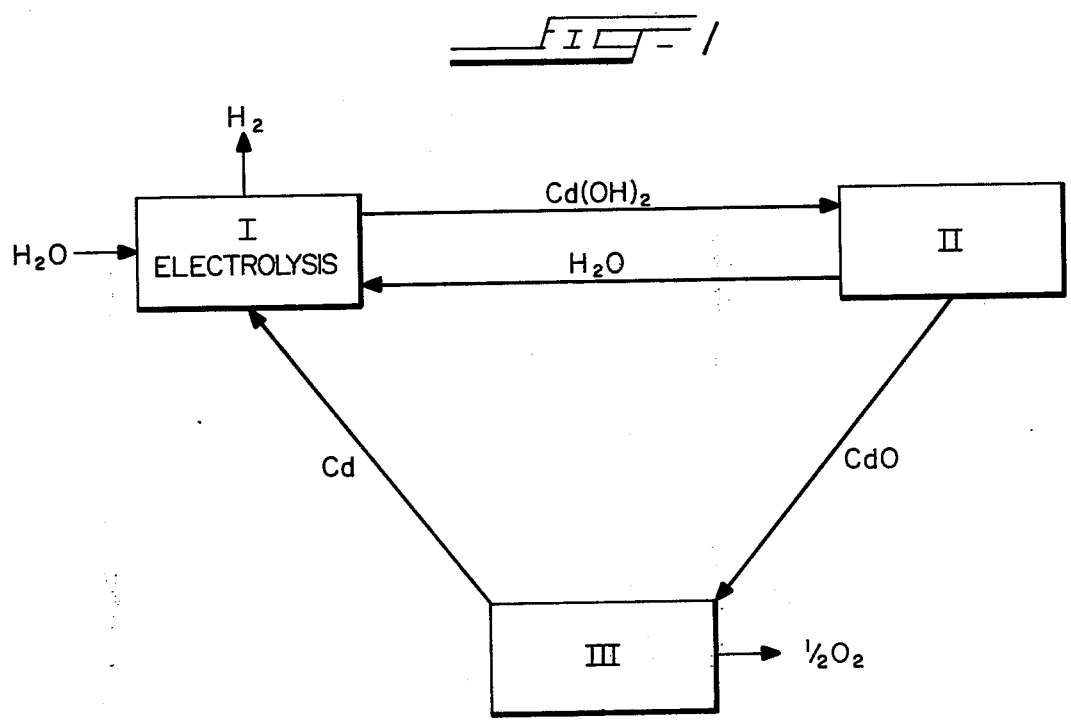

United States Patent [19]

Pangborn

[11] 3,907,980

[45] Sept. 23, 1975

[54] THERMO-ELECTROCHEMICAL PROCESS FOR PRODUCING HYDROGEN AND OXYGEN FROM WATER

[75] Inventor: Jon B. Pangborn, Lisle, Ill.

[73] Assignee: American Gas Association, Inc., Arlington, Va.

[22] Filed: Oct. 24, 1973

[21] Appl. No.: 409,029

[52] U.S. Cl. .................. 423/579; 204/96; 204/129
[51] Int. Cl. ...................... C01b 4/10; C01b 13/04
[58] Field of Search .............. 204/129, 96; 423/579

[56] References Cited
UNITED STATES PATENTS
2,366,402   1/1945   Hauel................................ 204/96

OTHER PUBLICATIONS
Handbook of Chemistry & 1950–1951, 32nd ed., 1950-1951, Chemical Rubber Publishing co., pp. 466–469.

*Primary Examiner*—R. L. Andrews
*Attorney, Agent, or Firm*—Thomas W. Speckman

[57] ABSTRACT

A combined thermo-electrochemical process for the production of hydrogen and oxygen from water comprising the steps of electrically hydrolyzing a cadmium anode in an aqueous electrolyte solution to form cadmium hydroxide and hydrogen; thermally decomposing the cadmium hydroxide to cadmium oxide and water at temperatures of about 300° to about 800° C; and decomposing the cadmium oxide to cadmium and oxygen at temperatures of about 800° to about 1400° C. The cadmium is recycled to the electrolysis reaction and oxygen and hydrogen are removed from the reaction system. A reactant regenerative closed cycle system is disclosed utilizing the process of this invention for the production of hydrogen with high energy efficiency.

17 Claims, 2 Drawing Figures

THERMO-ELECTROCHEMICAL PROCESS FOR PRODUCING HYDROGEN AND OXYGEN FROM WATER

This invention relates to a thermochemical process for the production of hydrogen and oxygen from water. The process provides a closed cycle reactant regenerative process for the production of hydrogen and oxygen from water requiring input of water, heat and a relatively minor amount of electrical energy.

Thermochemical cycles to produce hydrogen have been sought in recent years to provide hydrogen for use both as a fuel and as a chemical reactant. Especially in view of ecological and pollution considerations, the use of hydrogen as a fuel has attained greater significance. Hydrogen may be produced from water, a cheap and abundant raw material, and when burned reverts to water, a non-polluting chemical. Hydrogen may be readily stored and transported. Hydrogen also affords extreme flexibility in its utilization as a fuel providing advantages in many ways over present fuels for power sources such as turbines, reciprocating engines and fuel cells.

The present commercial method for the production of hydrogen is the direct electrolysis of water into its constituent elements of hydrogen and oxygen. The electrolysis process is dependent only upon electricity, and therefore its economics are solely dependent upon generating of electrical energy which is inefficient. Further, present industrial electrolyzers are very expensive.

Direct thermodecomposition of water is not promising, since water starts breaking with a reasonable yield at temperatures of 2,500° to 3,000° C. These temperatures are not attainable from heat sources such as nuclear reactors. Therefore, thermochemical cycles for production of hydrogen and oxygen from water at temperatures attainable from the output coolant of nuclear reactors and from solar energy sources would be desirable. With the greatly expanded use of nuclear reactors, it would be advantageous to utilize the heat given off by the reactor to produce hydrogen and oxygen from the water molecule providing a new fuel. High temperature gas reactors have output coolant temperatures in the order of 500° to 800° C. This heat output represents about 80 per cent of the product energy from the nuclear reactor. Recent trends have been toward increases in the output coolant temperature and such temperatures in the order of 1,000° to 1,200° C. can be expected as a development of present technology. Thermochemical processes for the production of hydrogen, utilizing such heat energy, have been sought in recent years.

Various thermochemical cycles for the production of hydrogen from water and the desirability of such production have been reviewed by C. Marchetti in "Hydrogen and Energy," Chemical Economy & Engineering Review, Jan., 1973, pg. 5, (Vol. 5, N.1).

A four step chemical cycle has been described by G. De Beni in French Pat. No. 2,035,558, Feb. 17, 1970, working with compounds of mercury, bromine, and calcium. This process is described as the Mark-1 cycle by Marchetti. The Mark-1 process has disadvantages in requiring the use of highly corrosive chemicals at elevated temperatures and pressures of in excess of 20 atmospheres. Marchetti has calculated efficiencies in the order of 55 per cent, but actual process problems have not been solved.

Vanadium and chlorine cycles, designated as Mark-3 by Marchetti, have been proposed J. E. Funk "Thermodynamics of Multi-Step Water Decomposition Processes" ACS Symposium on Non-Fossil Fuels, Volume 16, No. 4, pg. 79, American Chemical Society, 1972, but favorable conditions for reaction have not been found and energy efficiencies are very low.

A process utilizing cesium metal is described in U.S. Pat. No. 3,490,871, Jan. 20, 1970. While no experimental work is reported in the patent, it appears the process requires temperatures of at least 1,200° C. and presents difficult separations.

A process has been suggested by B. M. Abraham et al. "A Low-Temperature Thermal Process for the Decomposition of Water," Science, Vol. 180, June 1, 1973, pg. 959–960, using lithium nitrite and iodine. It is recognized that no confirming work has been done.

A U.S. Patent Application, Ser. No. 390,178; Process for Producing Hydrogen from Water; Jon B. Pangborn and John C. Sharer, discloses a reactant regenerative closed cycle process involving iron reduction and oxidation reactions.

It is an object of this invention to provide a process for producing hydrogen and oxygen from water wherein the primary energy requirement is thermal, only a minor electrical energy input being required for an electrolysis step.

It is another object of this invention to provide an efficient combined thermochemical-electrochemical process for the production and oxygen from water.

It is a further object of this invention to provide a process for the production of hydrogen and oxygen from water in which the reactants other than water are regenerated and the reaction may be conducted in a closed cycle.

It is another object of this invention to provide a process wherein the reaction products are easily separable.

It is a further object of this invention to provide an efficient principally thermochemical process for the high pressure production of hydrogen from water.

It is another object of this invention to provide a process for the production of hydrogen from water wherein the thermal coolant output of nuclear reactors and/or solar energy sources may be utilized to provide necessary energy input.

It is still a further object of this invention to provide a process having high energy efficiency for the production of hydrogen and oxygen from water.

It is another object of this invention to provide a process for the production of hydrogen from water wherein the transfer of materials from one reaction site to another takes place in the gaseous phase except for the liquid electrolyte.

Figure 2:
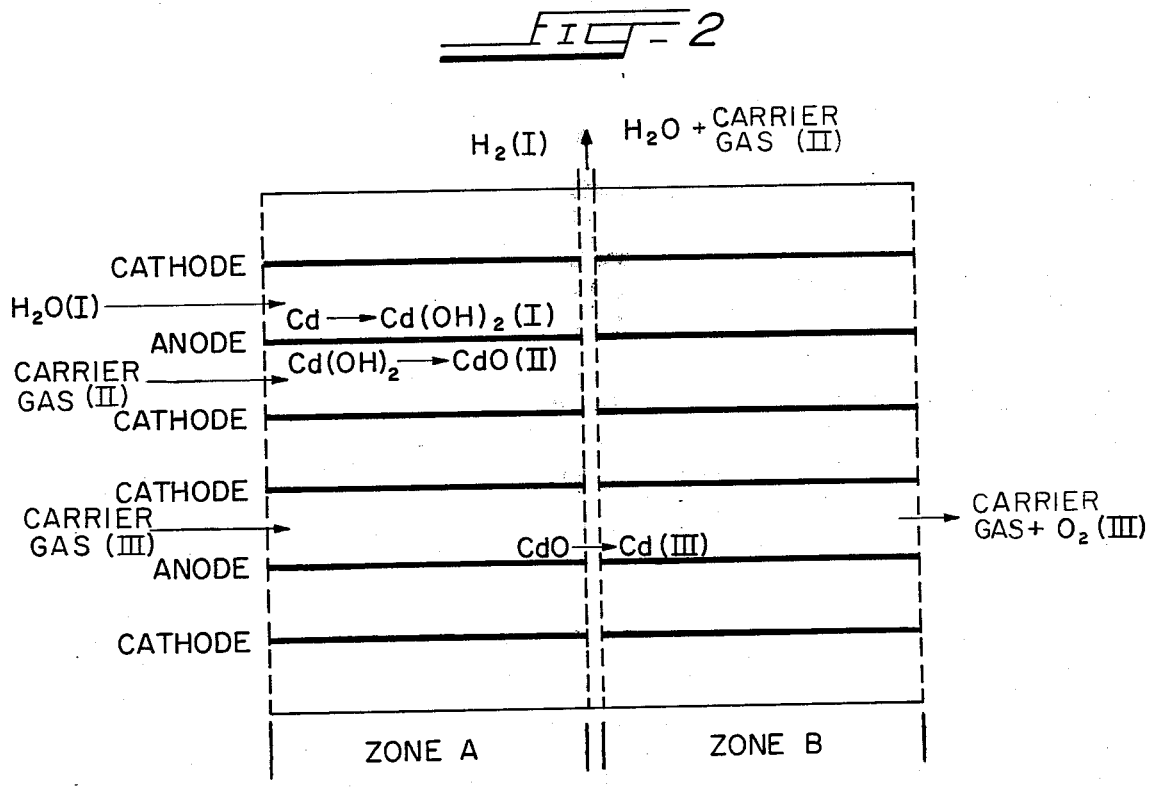

These and other objects, advantages and features of this invention will be apparent from the description together with the drawings, wherein:

FIg. 1 is a schematic flow diagram of a process for the production of hydrogen and oxygen according to this invention; and FIG. 2 is a schematic process flow diagram of one embodiment of this invention.

This invention provides a process for the production of hydrogen and oxygen from water comprising the steps of electrically hydrolyzing a cadmium anode in an aqueous electrolyte solution to form solid cadmium hydroxide, then thermally decomposing the solid cadmium hydroxide to cadmium oxide at temperatures from about 300° to 800° C., and then decomposing the cadmium oxide to cadmium and oxygen at temperatures of about 800° to 1,400° C.

The chemical reactions taking place in the overall process may be expressed by the following equations:

$$Cd + 2H_2O \rightarrow Cd(OH)_2 + H_2 \qquad \text{I}$$

$$Cd(OH)_2 \rightarrow CdO + H_2O \qquad \text{II}$$

$$CdO \rightarrow Cd + 1/2 O_2 \qquad \text{III}$$

The combination of the above reactions, utilized in this invention, are schematically shown in the flow diagram of FIG. 1. Further description of the above reactions is set forth in the following description setting forth preferred embodiments of this invention in a reactant regenerative closed cycle. By the term "reactant regenerative closed cycle" system is meant a system which minimizes the addition of reactant chemicals other than water and which minimizes reactant products to be removed from the system other than the desired gaseous hydrogen and gaseous oxygen.

The reaction expressed by equation I is an electrolysis reaction which proceeds in suitable ionic electrolyte solutions, such as basic, neutral or acidic electrolytes. Suitable basic electrolyte solutions include as exemplary, potassium hydroxide, sodium hydroxide and lithium hydroxide. Suitable neutral electrolyte solutions include as exemplary, sodium chloride, potassium chloride and lithium and other soluble alkali chlorides. A cadmium anode and a carbon or nickel or noble metal, such as platinum, cathode are suitable for the electrolysis reaction. Upon imposing a potential greater than the theoretical 0.02 volts (at one normal concentration), the reaction of equation I proceeds. Tests have shown using a cadmium anode and platinum cathode with a 1 normal sodium hydroxide electrolyte that continuous hydrogen production results at 0.06 volts and 100 milliamps per square centimeter good hydrogen production was obtained. Potentials above about 0.1 volts are suitable, dependent upon cell geometry, electrolyte and electrode resistance. Higher limits of voltage are limited by economics, but about 0.1 to about 1 volt is suitable, about 0.1 about 0.5 volts being preferred. Tests have shown that at 10° C., electrode and electrolyte resistance, hydrogen evolution overpotential, and other voltage requirements amount to about 0.2 volts at practical operating current densities. The reaction of equation I has been found to proceed well at a potential of 0.25 volts using potassium hydroxide electrolyte in laboratory electrolysis equipment. As confirmed by further tests the chloride electrolysis reaction of equation I operates at the potential of 0.45 volts. The above voltage requirements are based upon current electrolysis technology and it is anticipated that improved electrolysis technology would lower these voltage requirements.

The reaction expressed by equation I proceeds forming solid cadmium hydroxide at the anode and evolving gaseous hydrogen at the cathode. It has been noted that the solid cadmium hydroxide formed tends to adhere to the anode in basic solution electrolysis while the solid cadmium hydroxide formed accumulates as a precipitate in neutral solution hydrolysis. It should be noted that unlike conventional water electrolysis, hydrogen is the only gaseous product produced in the electrolysis step. Further, complicated hydrogen-oxygen-electrolyte separating devices necessary in conventional water electrolysis are not required in the process of this invention. The produced hydrogen is essentially pure, the only contaminant being a trace of water vapor.

An important aspect of this invention is the very low electrical potential requirement for the electrolysis reaction of equation I. Conventional electrolysis to produce hydrogen and oxygen from water requires electrical potentials greater than about 1.48 volts, while the electrical potential requirement for electrolysis of this invention has been demonstrated at 0.25 volts.

The process of this invention requires less than about 30 kilocalories (Thermal) per gram-mole of hydrogen produced to drive the electrolysis of equation I, whereas conventional electrolysis of water requires more than 150 kilocalories (Thermal) to generate the necessary electricity. The electrical potential requirements for the electrolysis of equation I are so low that direct photoelectric or thermoelectric solar energy sources, such as photovoltaic or diode solar cells, thermocouples and the like, can be utilized.

The electrolysis of the reaction expressed by equation I is desirably carried out at temperatures of about 10° to 90° C., preferred temperature, being about 25° to 60° C. at one atmosphere pressure. At higher pressures, the temperatures may be correspondingly higher as long as the electrolyte solution is maintained in liquid form. The electrolysis reaction expressed by equation I may be performed at one atmosphere pressure or it may be performed at elevated pressures to produce pressurized hydrogen. Elevated pressures are dependent upon material strengths and containment. However, pressures up to about 50 atmospheres are suitable. At elevated pressures the electrical energy inputs for electrolysis are increased, but there is an overall energy advantage to produce hydrogen by pressure electrolysis as compared to later mechanical compression. By the process of this invention hydrogen can be efficiently produced at elevated pressures so that mechanical compression to pipeline pressures is feasible. The process of this invention may be carried out at sufficiently high pressures so that further compression to produce pipeline pressures may not be necessary.

The electrolyte solution is separated from the solid cadmium hydroxide prior to the reaction expressed by equation II. The solid cadmium hydroxide is thermally decomposed by heating to about 300° to 800° C. where the reaction expressed by equation II takes place forming solid cadmium oxide and steam. Preferred reaction temperatures are about 350° to about 500° C. The steam produced by the reaction of equation II may be recycled back as a reactant for the reaction of equation I where it condenses in the electrolyte solution to partially supply make-up water. The steam produced may alternatively be used for electric power generation necessary for the electrolysis of equation I or as a source to provide partial heating to the solid cadmium hydroxide reactant of equation II.

The reaction of equation III expresses the thermal decomposition of cadmium oxide to cadmium and oxygen. Suitable reaction temperatures for the reaction of equation III are about 800° to about 1,400° C. depending upon pressure. At one atmosphere the preferred reaction temperatures are about 1,100° to about 1,200°

C. At about one-half atmosphere it has been found that the preferred reaction temperatures are about 800° to about 850° C. preceeded by initial heating to about 1,000° C. at 1 atmosphere.

The decomposition reaction III follows reaction II in situ thereby avoding any movement of cadmium solids. At the temperatures required for the decomposition of the reaction expressed by equation III the cadmium product is gaseous as well as the oxygen product being gaseous. However, these two gases may be readily separated by condensation of the cadmium at less than 765° C. (one atmosphere) and solidification of the cadmium at less than 320° C. (one atmosphere). Thus, passing the gaseous mixture over cool surfaces provides for condensation of the metallic cadmium which deposits in porous crystalline formations and removal of the gaseous oxygen.

It is convenient to supply the heat necessarly for the reaction of equation III by a continuous flow of an inert carrier gas, such as helium, argon, and steam which may supply the heat for the reaction and transport the gaseous cadmium and oxygen products to a color zone for separation of the cadmium and oxygen by condensation of the cadmium. Separation of the carrier gas and oxygen may be readily effected by adsorption, liquifaction distillation, membrane processes or condensation in the case of steam. Additionally, the oxygen-carrier gas mixture may be used as an oxidant for hydrogen in combustion at any nearby energy consuming plant. The carrier gas may be readily separated from the combustion produced steam and recycled in the process of this invention.

The thermal energy from the product streams of the reaction of equation III may be used for other requirements of the total process, such as heating for the reaction of equation II or to partially heat the reactants for the process of equation III.

A reactant regenerative closed cycle process for the production of hydrogen and oxygen from water according to the process of this invention comprises the steps of electrically hydrolyzing a cadmium anode in an aqueous electrolyte in a first reaction zone to produce cadmium hydroxide and hydrogen, removing the hydrogen produced and heating the cadmium hydroxide in a second reaction zone to about 300° to about 800° C. thermally decompositing the cadmium hydroxide to cadmium oxide and water, removing the water produced and heating the cadmium oxide in a third reaction zone to about 800° to about 1,400° C. forming gaseous cadmium and oxygen, removing the oxygen produced and cooling the gaseous cadmium in a fourth reaction zone to less than about 320° C. depositing the cadmium on an anode for use in a first reaction zone. When reaction zones are referred to, it is not meant that they necessarily be physically separate volumes, but the same physical volume under different conditions, such as temperature or pressure, is referred to as different zones.

FIG. 2 is a schematic process flow diagram of one embodiment of this invention. The reactive regenerative closed cycle process of this invention may be conveniently carried out in multiple electrolyte cell reactors having two interconnected but out of phase zones. The cycle is initiated in zone A having graphite anodes coated with cadmium metal and bare graphite cathodes. The second zone, zone B, contains bare graphite plate electrodes. Zone A contains a suitable electrolyte solution as disclosed above and a supply means for applying the necessary electrical potential between the anodes and cathodes. The electric potential is supplied to the anodes and cathodes in zone A and the reaction of equation I commences with gaseous hydrogen being collected in the vapor space above the electrolyte solution and readily removed from the reaction vessel. The solid cadmium hydroxide is then separated from the liquid electrolyte by draining the electrolyte from the reactor and zone A is heated to about 400° C. by any suitable means, prefeably by injection of hot carrier gas between the electrodes. The reaction of equation II then takes place decomposing the cadmium hydroxide to cadmium oxide and steam. Conveniently, the steam can be removed with the flow of hot carrier gas. The reaction of equation III may then be caused to occur by injecting hot carrier gas between the electrodes of zone A, causing the cadmium oxide to decompose to gaseous cadmium and oxygen at temperatures above about 900° C. The heat of reaction cools the carrier gas which transports the gaseous cadmium and oxygen to zone B. In zone B the anode surfaces are maintained below 320° C. while the cathode surfaces are maintained above 775° C. thus depositing the cadmium on cooled anode surfaces. This temperature differential may be achieved by the previously mentioned heat of reaction cooling effect and also additional cool inert gas may be selectively injected at the introduction of flow into zone B. Oxygen and inert gas are removed after passing through zone B. After cooling electrolyte solution is added to zone B and the entire process recycled starting with the reaction of equation I in zone B with the gas flows in reverse direction to the previous cycle. Thus, it is seen that multiple cells may readily be cycled, using the process of this invention and may be operated either in series or in parallel as desired with most efficient heat treansfer between the cycles being effected by methods well known in the art.

The carrier gas and oxygen leaving the reactor may be separated by adsorption, liquifaction-distillation, membrane processes, or condensation in the case of steam. The oxygen product may be removed for storage or for the direct use as oxygen in another chemical process.

The process schemes of this invention provide that there is no necessary transport of solids in the process, all of the material transport from one reaction site to another occurring in the gaseous phase except for the liquid electrolyte. This feature is important to obtain high energy efficiencies.

The energy efficiency of the process shown in FIGS. 1 and 2 has been calculated to be 64%. The calculation can be summarized by the total heat input to the cycle per mole of hydrogen produced due to the ideal heat requirement of all endothermic reactions and material streams which is 119 kcal; and due to the ideal heat avilable from all exothermic reactions and material streams, which is 51 kcal; and due to the additional heat required because of process step temperature levels which necessarily produce waste heat, which is 17 kcal; and due to step work requirements including electrolysis at 75% efficiency for which further additional heat is needed, which is 21 kcal. Thus, the total process heat requirement is 106 kcal per mole of hydrogen produced. The theoretical heating value of hydrogen per mole is 68.3 kcal. Thus the energy efficiency may be expressed as $$\text{Energy Efficiency} = \frac{\text{Heat Output (or Heating Value per Mole H}_2\text{)}}{\text{Heat to process + Heat required for work}}$$

and is computed to be 64%.

Thus the process of this invention has higher energy efficiency than previously disclosed processes.

Reactors and process equipment can be of suitable material as will be obvious to one skilled in the art. For example, glass and ceramic lined reactors are suitable.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In a reactant regenerative closed cycle process for the production of hydrogen and oxygen from water the steps comprising:

electrolytically hydrolyzing in an aqueous electrolyte solution a porous crystalline cadmium anode produced by condensation of gaseous cadmium to form cadmium hydroxide and hydrogen;

thermally decomposing said cadmium hydroxide to cadmium oxide at temperatures of about 300° to about 800° C.; and thermally decomposing said cadmium oxide to cadmium and oxygen at temperatures of about 800° to about 1,400° C. and condensing the gaseous cadmium to a porous crystalline solid for use as an anode the primary energy input requirement of said process being thermal.

2. The process of claim 1 wherein the cadmium hydroxide is decomposed at about 350° to about 500° C.

3. The process of claim 1 wherein the cadmium oxide is decomposed at about 1,100° to about 1,200° C.

4. The process of claim 1 wherein the cadmium oxide decomposition is initiated at about 1,000° C. at about one atmosphere and continued at about 800° C. to about 850° C. at about one-half atmosphere pressure.

5. The process of claim 1 wherein the aqueous electrolyte solution is selected from the gorup consisting of neutral and basic electrolytes.

6. The process of claim 5 wherein the neutral electrolytes are selected from the group consisting of sodium chloride, potassium chloride, lithium chloride and other soluble alkali chlorides.

7. The process of claim 5 wherein the basic electrolytes are selected from the group consisting of potassium hydroxide, sodium hydroxide and lithium hydroxide.

8. The process of claim 1 wherein the process is carried out at about one-half to about 50 atmospheres pressure.

9. A reactant regenerative closed cycle process for the production of hydrogen and oxygen from water comprising the steps:

electrolytically hydrolyzing a porous crystalline cadmium anode, produced by condensation of gaseous cadmium, in an aqueous electrolyte in a first reaction zone to produce cadmium hydroxide and hydrogen;

removing the hydrogen produced and heating said cadmium hydroxide in a second reaction zone to about 300° to about 800° C. thermally decomposition said cadmium hydroxide to cadmium oxide and water;

removing the water produced and heating said cadmium oxide in a third reaction zone to about 800° to about 1,400° C. forming gaseous cadmium and oxygen; and removing the oxygen produced and cooling said gaseous cadmium in a fourth reaction zone to less than about 320° C. depositing said cadmium on an anode as porous crystalline cadmium for use in a first reaction zone the primary energy input requirement of said process being thermal.

10. The process of claim 9 wherein said water produced is removed from said second reaction zone and provided to said first reaction zone.

11. The process of claim 9 wherein said second reaction zone is heated with a hot carrier gas.

12. The process of claim 9 wherein said third reaction zone is heated with a hot carrier gas which transfers and gaseous cadmium from the third to the fourth reaction zone.

13. The process of claim 9 wherein said second reaction zone is maintained at about 350° to about 500° C.

14. The process of claim 9 wherein said third reaction zone is maintained at about 1100° to about 1,200° C.

15. The process of claim 9 wherein said third reaction zone is heated to about 1,000° C at one atmosphere and the temperature then reduced to about 800° to about 850° C. at about one-half atmosphere pressure.

16. The process of claim 9 wherein said closed cycle is maintained at about one-half to about 50 atmosphere pressure.

17. The process of claim 9 wherein the anode surfaces are maintained below 320° C. and the cathode surfaces are maintained above 775° C. in the fourth reaction zone.

* * * * *